United States Patent
Reuss

(10) Patent No.: US 7,881,927 B1
(45) Date of Patent: Feb. 1, 2011

(54) ADAPTIVE SIDETONE AND ADAPTIVE VOICE ACTIVITY DETECT (VAD) THRESHOLD FOR SPEECH PROCESSING

(75) Inventor: Edward L. Reuss, Santa Cruz, CA (US)

(73) Assignee: Plantronics, Inc., Santa Cruz, CA (US)

( * ) Notice: Subject to any disclaimer, the term of this patent is extended or adjusted under 35 U.S.C. 154(b) by 2099 days.

(21) Appl. No.: 10/672,473

(22) Filed: Sep. 26, 2003

(51) Int. Cl.
*G10L 21/02* (2006.01)

(52) U.S. Cl. .................................................. 704/226

(58) Field of Classification Search .............. 704/210, 704/226

See application file for complete search history.

(56) References Cited

U.S. PATENT DOCUMENTS

| | | | |
|---|---|---|---|
| 6,389,111 B1 * | 5/2002 | Hollier et al. ............... 379/28 |
| 6,850,617 B1 * | 2/2005 | Weigand ..................... 379/391 |
| 2002/0090078 A1 * | 7/2002 | Feltstrom et al. ....... 379/390.01 |
| 2004/0174989 A1 * | 9/2004 | Michaelis ................... 379/391 |

* cited by examiner

*Primary Examiner*—Jakieda R Jackson
(74) *Attorney, Agent, or Firm*—Intellectual Property Law Office of Thomas Chuang

(57) ABSTRACT

Systems and methods for adaptive sidetone and adaptive voice activity detect (VAD) threshold for speech processing are disclosed. The VAD system generally includes an adaptive VAD threshold generator configured to generate a VAD threshold based on an increase in voice level resulting from sidetone attenuation and a comparator for comparing received signals to the adaptive VAD threshold to determine the existence of voice activity. The sidetone attenuation is based on an average ambient noise energy level determined from a noise energy amplitude during periods of no voice activity and a comparator for comparing received signals to the adaptive VAD threshold to determine existence of voice activity.

35 Claims, 4 Drawing Sheets

ADAPTIVE SIDETONE AND ADAPTIVE VOICE ACTIVITY DETECT (VAD) THRESHOLD FOR SPEECH PROCESSING

BACKGROUND OF THE INVENTION

1. Field of the Invention

The present invention relates generally to speech processing in communications systems. More specifically, systems and methods for adaptive sidetone and adaptive voice activity detect (VAD) threshold for speech processing are disclosed.

2. Description of Related Art

Modern communication systems greatly rely on digital speech processing in order to provide efficient systems. Examples of such communication systems are digital telephony trunks, voice mail, voice annotation, answering machines, digital voice over data links and the like. Such speech processing systems often incorporate a voice activity detect (VAD) function, also referred to as a signal classifier. The VAD determines when the user is speaking and when the user is silent. The output of the VAD, also known as a voicing decision, is binary. The voicing decision may be used to control, for example, when to measure the level of background noise, when to suppress sending speech packets across a wireless medium (silence suppression), when to adapt a speech filter or speech beamformer to the user's speech, or when to adapt a noise filter or noise beamformer to the background noise.

A VAD threshold is used to determine whether speech is present and is a critical parameter for the proper operation of these speech processing systems implementing VAD. The VAD threshold may be a single fixed value for all levels of noise that is used to compare to a running average of short term integrated energy in the input signal over some integration interval, usually a few milliseconds to hundreds of milliseconds. The VAD threshold may also be adapted to the noise level as measured over a long interval, such as ten to hundreds of seconds. More complex solutions use a VAD vector of thresholds that is used to compare to short term energy in several audio frequency sub-bands and then sum them together in some weighted manner where the weights reflect the relative importance of each of the sub-bands.

However, one problem with such VAD thresholds is that a fixed value is not optimal for all levels of ambient noise that may surround the speaker, particularly when the noise level is high. Normal speech may include as much as 60% of silence on average in a two-way conversation. During the periods of silence, the microphone or other speech input device picks up the environment or background noise. The noise characteristics and level may vary significantly, for example, from those of a quiet room to those of a noisy street. If the VAD threshold is too low, then the VAD will suffer a high level of false positive errors in a high ambient noise situation. If the threshold is too high, then the VAD will report a high level of false negative errors when the speaker is in a quiet environment.

In addition, in a high noise environment, the speech to noise ratio is so low that even if the VAD threshold is set to the optimal point, the VAD algorithm suffers enough errors that the threshold adaptation often adapts to the speaker's voice or does not have a chance to adapt to the unvoiced noise. This tends to draw the threshold away from the optimal point, which can further reduce the VAD accuracy.

Thus it would be desirable to provide an improved VAD system with lower false positive and negative rates in high noise environments.

SUMMARY OF THE INVENTION

Systems and methods for adaptive sidetone and adaptive voice activity detect (VAD) threshold for speech processing are disclosed. It should be appreciated that the present invention can be implemented in numerous ways, including as a process, an apparatus, a system, a device, a method, or a computer readable medium such as a computer readable storage medium or a computer network wherein program instructions are sent over optical or electronic communication lines. Several inventive embodiments of the present invention are described below.

The voice activity detect method generally includes determining an average noise energy level of the communications signals based on noise energy amplitude during periods of no voice activity, converting the average noise energy level to sidetone attenuation, generating an optimized VAD threshold based at least in part on an increase in voice level resulting from the sidetone attenuation, and performing VAD based on the generated VAD threshold. The average noise energy may be determined by detecting periods of no voice activity (or silence), determining noise energy amplitude during the periods of no voice activity, and integrating the noise energy amplitude over an integration period to generate the average noise energy. The average noise energy level may be converted to sidetone attenuation according to a predetermined ambient noise to sidetone attenuation transfer function and to attack and release time constants. The ambient noise to sidetone attenuation transfer function may include low and high ambient noise thresholds and minimum and maximum sidetone attenuation levels such that the sidetone attenuation is set to the minimum or maximum sidetone attenuation level when the noise energy level is below or above the low or high ambient noise threshold, respectively. The sidetone attenuation preferably increases linearly between the minimum and maximum sidetone attenuation levels as the noise level increases from the low to the high ambient noise threshold.

The generating of the VAD threshold may include utilizing an estimated, actual, and/or an expected increase in voice level based on the sidetone attenuation. The VAD threshold may be increased in proportion to the increase in voice level and/or increased based on the sidetone attenuation. The gain on the communications signals may be reduced in proportion to the increase in voice level.

The VAD system generally includes an adaptive VAD threshold generator configured to generate an optimized VAD threshold based on an increase in voice level resulting from sidetone attenuation and a comparator for comparing received signals to the adaptive VAD threshold to determine existence of voice activity. The sidetone attenuation is based on an average ambient noise energy level determined from a noise energy amplitude during periods of no voice activity and a comparator for comparing received signals to the adaptive VAD threshold to determine existence of voice activity.

A communications system incorporating an adaptive VAD system generally includes a voice activity detector and an adaptive sidetone control in communication with the microphone and the voice activity detector, the sidetone control being based on an average ambient noise energy level determined from a noise energy amplitude during periods of no voice activity as determined by the voice activity detector, the adaptive sidetone control being configured to attenuate the sidetone level with increased ambient noise level.

These and other features and advantages of the present invention will be presented in more detail in the following detailed description and the accompanying figures which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements.

DESCRIPTION OF SPECIFIC EMBODIMENTS

Systems and methods for adaptive sidetone and adaptive voice activity detect (VAD) threshold for speech processing are disclosed. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein. For purpose of clarity, details relating to technical material that is known in the technical fields related to the invention have not been described in detail so as not to unnecessarily obscure the present invention.

VAD thresholds are preferably adaptive and may be determined based on the output of an adaptive sidetone control that decreases the sidetone level in a noisy environment to encourage the speaker to speak louder and thereby increase the speech to ambient noise ratio (SANR). With increased SANR, adaptive VAD thresholds should improve VAD accuracy and thus improve the performance of speech enhancement algorithms employing VAD. In one implementation, the VAD thresholds may be raised by the expected average increase in speech level due to reduced sidetone level which may be determined algorithmically and/or empirically. However, more complex VAD threshold adaptation algorithms may also be employed although stability problems may accompany complex algorithms.

For example, a simple linear formula may be used to adjust the VAD threshold to an optimal value, as follows:

$$VAD_{threshold\ adapted} = VAD_{threshold\ nominal} + A * sidetone\_attenuation$$

where A is a constant with a value between 0 and 1. Similarly, a weighted vector of constants of a frequency domain implementation may also be used, as follows:

$$VAD_{threshold\ adapted}(n) = VAD_{threshold\ nominal}(n) + A(n) * sidetone\_attenuation$$

where $VAD_{threshold\ adapted}$ (n) is element n of a vector of adapted VAD thresholds, or more specifically, VAD sensitivities for each frequency bin of a frequency domain representation of the speech waveform. $VAD_{threshold\ nominal}$(n) is element n of a vector of the nominal VAD thresholds as generated from the background noise estimator. A(n) is element n of a vector of constants describing the sensitivity of each frequency component of the VAD threshold to the variations in the sidetone attenuation. Those skilled in the art will recognize that non-linear variations of these formulae may also be employed.

Figure 1:
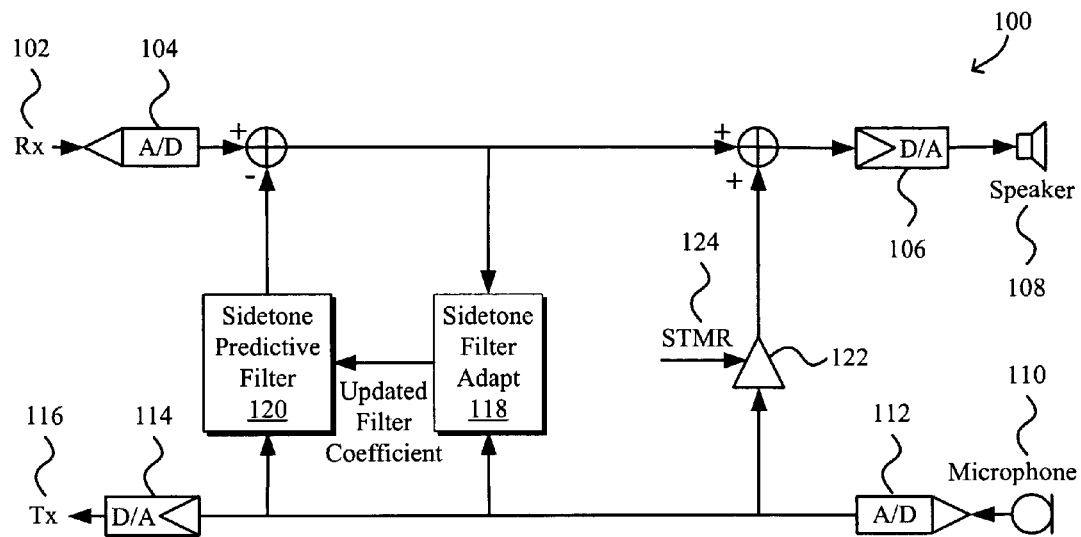
FIG. 1 is a block diagram illustrating a communications system implementing a constant sidetone system.

Prior to a discussion on the adaptive sidetone control, a background discussion on the non-adaptive constant sidetone mechanism is presented with reference to FIG. 1. In particular, FIG. 1 is a block diagram illustrating a communications system 100 implementing a constant sidetone system. The communications system 100 may be a telephone headset or a handset, for example. Although the communications system 100 shown is a digital implementation, it is to be understood that analog and/or digital-analog hybrid implementations may be employed. As shown, the communications system 100 includes various analog to digital (A/D) and digital to analog (D/A) converters for converting analog signals to digital signals and for converting digital signals to analog signals, respectively. For the signal receiving data path, the system 100 converts received signals (Rx) 102 to digital signals with an A/D converter 104. After various digital signal processing (DSP), the received signals are converted back to analog signals using a D/A converter 106 and output on a speaker 108. For the signal transmission data path, analog signals received from a microphone 110 may be converted to digital signals using an A/D converter 112. The digital transmit signals are utilized for various digital signal processing functions and converted back to analog signals using a D/A converter 114 and transmitted as transmit signals 116.

Although the communications system 100 shown is a digital implementation, i.e., the entire receive and transmit data paths are DSP-based, it is to be understood that analog and/or digital-analog hybrid implementations may be employed. The digital implementation of the communications system 100 may be adopted for applications such as a wireless headset or handset using digital radios.

The communications system 100 implementing digital data paths preferably includes an adaptive sidetone cancellation circuit that includes a sidetone filter adapter 118 and a sidetone predictive filter 120. The adaptive sidetone cancellation circuit is a network line echo canceller that cancels out the normal terminal network induced sidetone from the received signals which varies with the receive volume.

The telephone sidetone is removed from the received signals because in communications systems implementing digital data paths, such as digital wireless headsets or handsets, the telephone sidetone is delayed sufficiently, typically several milliseconds, so as to be an annoyance and/or distraction to the user. In other words, if the reflected electric sidetone signal has a noticeable delay, typically 2 or more ms, the user generally interprets the signal as an echo rather than sidetone. The term "telephone sidetone" is generally used herein as a combination of what is normally referred to as local sidetone coming from the local hybrid and network echo coming from the rest of the network. The headset or handset sidetone is the signal from the user's voice that is returned to the speaker 108. Sidetone allows the user to hear the user's own voice as the user speaks. As used herein, "user" generally refers to the near-end person using the headset or handset while "far-end listener" refers to the person at the other end of the telephone conversation.

The communications system 100 implementing digital data paths preferably also includes an amplifier 122 with a constant gain 124 to inject a local sidetone after the residual sidetone from the telephone line is removed from the received signals. In other words, a locally synthesized constant amplitude sidetone independent of the receive volume control setting is generated from the transmit signal and added to the receive path. Because the normal telephone sidetone in a digital packet-based wireless headset/handset is often delayed by several milliseconds to be an annoyance and distraction to the user, as noted above, a locally synthesized sidetone is preferred over the normal telephone sidetone.

The level of the injected sidetone or the constant gain for the amplifier 122 is preferably defined in terms of a sidetone masking rating (STMR) 124. For example, a typical STMR for a constant sidetone leveling system is 10 dB for analog telephony only, 12 dB for digital or wireless in Europe, and 16 dB for digital or wireless in North America. Because the normal path loss from a person's mouth to the ear is approximately 15 dB, an injected sidetone using an STMR of 10 dB for an analog phone would be approximately 5 dB louder than what the user hears acoustically from the user's mouth.

Figure 2:
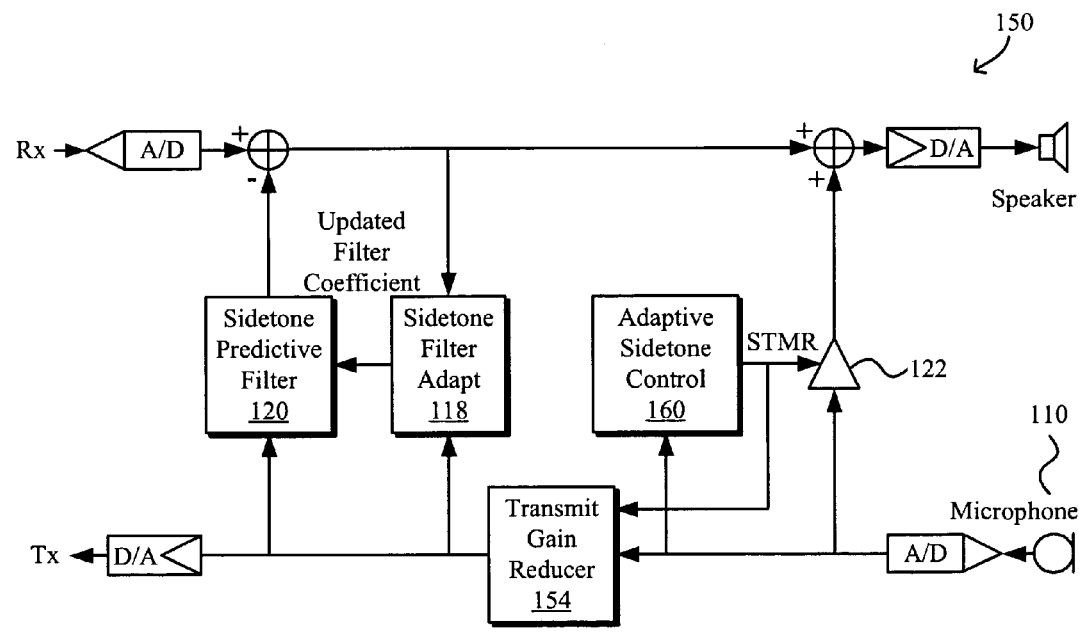
FIG. 2 is a block diagram illustrating a communications system implementing an adaptive sidetone system.

Having presented a background discussion on the non-adaptive constant sidetone mechanism, the adaptive sidetone control will now be discussed with reference to FIGS. 2-6. In particular, FIG. 2 is a block diagram illustrating a communications system 150 implementing an adaptive sidetone control 160. The adaptive sidetone control 160 is an ambient noise level detector that measures background noise level picked up by the microphone 110. The detected noise level is used to control the gain of the sidetone injection. The sidetone adaptation may be implemented in a frequency dependent manner in which some parts of the sidetone frequency spectrum are compressed more than others, similar to the multi-band compression techniques used for hearing aids. The background noise detection may also be additionally or alternatively implemented using a frequency-weighted analysis. Where both the frequency dependent sidetone adaptation techniques and the frequency-weighted background noise detection technique are implemented, the sidetone frequency response is preferably matched in some manner to the background noise frequency response.

The adaptive sidetone control 160 continuously varies the amplitude of the sidetone level to the headset or handset user by continuously adapting the sidetone depending on the level of ambient acoustic noise sources detected by the microphone. If the ambient noise level is high, the sidetone level is reduced (i.e., sidetone attenuation is increased), which will likely induce the user to speak louder so that the user can hear the user's own sidetone-generated voice. This adaptive sidetone concept thus encourages the user to speak louder in a noisy environment by increasing the STMR which decreases the sidetone loudness and thus improves the speech to ambient noise ratio (SANR) perceived by the far-end listener.

Preferably, a corresponding reduction in the transmit gain proportional to the reduction in the sidetone gain is implemented via a transmit gain reducer 154 so as to keep the user's voice amplitude within the normal telephone amplitude range. The proportional reduction in the transmit gain thus maintains the speech level presented to the far-end listener effectively the same regardless of the ambient noise level while reducing the ambient noise perceived by the far-end listener. In addition to inducing the user to speak louder in a high ambient noise environment, reducing the sidetone level in a high ambient noise environment also results in a reduction in the amount of ambient noise injected into the user's ear from the sidetone signal, i.e., the user hears less of the ambient noise through the sidetone, sometimes referred to as listener sidetone. A reduction in the amount of ambient noise injected into the user's ear from the sidetone signal reduces user discomfort in high ambient noise conditions.

By encouraging the user to speak louder in high ambient noise conditions and thus increasing the speech to ambient noise ratio (SANR), the VAD threshold adaptation to find an optimal threshold value is also improved. For example, the optimal threshold value may suffer fewer false positives and fewer false negatives as a result of the improved SANR. A simpler approach may be to merely raise the VAD threshold value by the expected average increase in speech level due to the reduced sidetone level. This simpler approach thus avoids a more complex VAD threshold adaptation algorithm and any accompanying potential stability problems.

Figure 3:
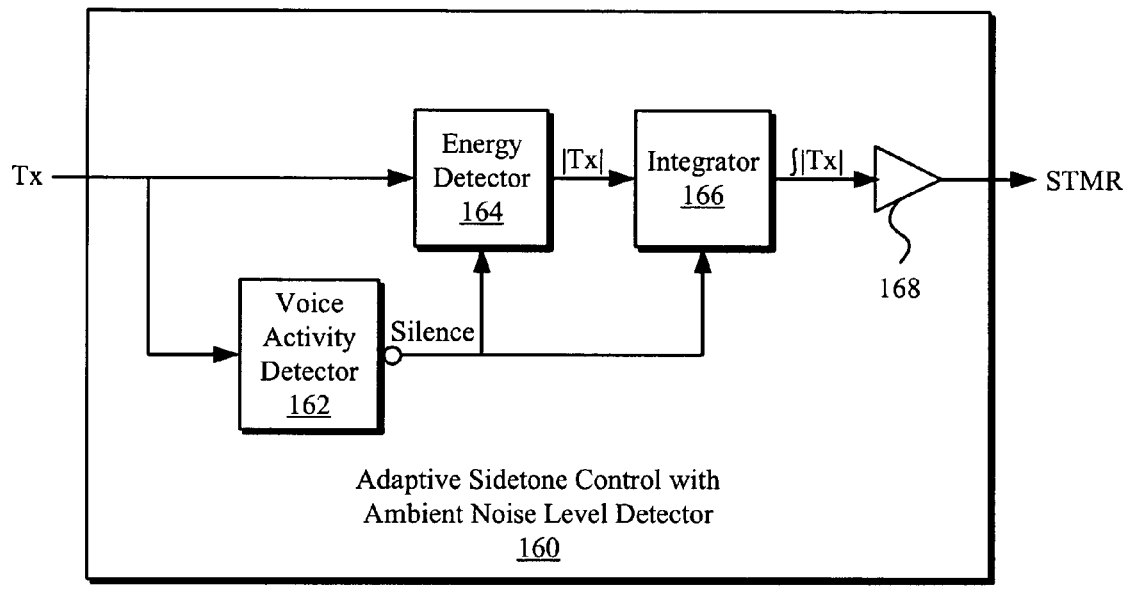
FIG. 3 is a block diagram illustrating an ambient noise level detector of the communications system of FIG. 2 in more detail.

The adaptive sidetone control 160 is shown in more detail in the block diagram of FIG. 3. In particular, the adaptive sidetone control 160 includes a no voice activity detector (NVAD) or silence detector 162 which monitors the transmit signal Tx from the microphone and detects for silence. When the user is not speaking, the output of the NVAD is TRUE. Note that a VAD function may already exist in the communications system and a NVAD would simply be the inverse of a VAD. The adaptive sidetone control 160 also includes an energy detector 164 and an integrator 166 that generates an estimate of the average noise energy by averaging the noise amplitude detected |Tx| over an integration period during periods of silence. The noise level output signal is converted to the sidetone gain using amplifier 168 according to a predetermined ambient noise to STMR transfer function. As noted above, STMR is used to control the sidetone injection level.

Figure 4:
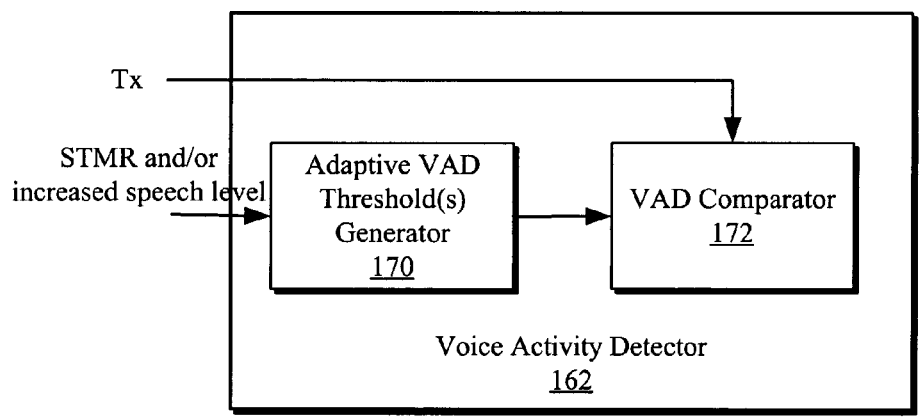
FIG. 4 is a block diagram illustrating the adaptive VAD threshold(s) determinator.

FIG. 4 is a block diagram illustrating the VAD 162 in more detail. As shown, the VAD 162 includes an adaptive VAD threshold(s) generator 170 and a VAD comparator 172. The adaptive VAD threshold(s) generator 170 receives as input the STMR from the adaptive sidetone control 160 and/or the expected, estimated, or actual average increase in speech level due to reduced sidetone level. The VAD threshold may be a single value or may be a vector of thresholds each corresponding to an audio frequency sub-band. The vector of thresholds may be used to compare to a short term energy in several audio frequency sub-bands and summed in a weighted manner to reflect the relative importance of each of the audio frequency sub-bands. Based on the output of the adaptive VAD threshold(s) determinator 170 as well as the transmit signal Tx, the VAD comparator 172 makes the determination whether there is voice activity or silence.

The expected, estimated, or actual average increase in speech level due to reduced sidetone level may be determined empirically and/or algorithmically. However, more complex VAD threshold adaptation algorithms utilizing the output from the adaptive sidetone control 160 may also be employed.

Figure 5:
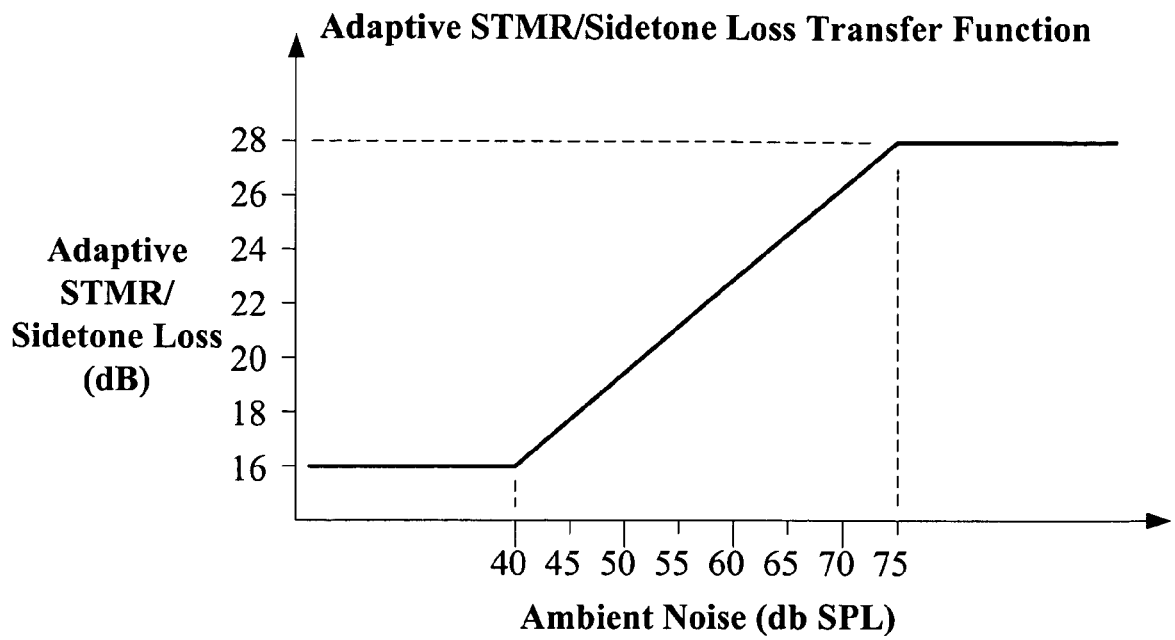
FIG. 5 is an illustrative graph of an ambient noise to adaptive STMR or sidetone loss transfer function.

FIG. 5 is graph of an illustrative adaptive STMR or sidetone loss to ambient noise transfer function. As is known, increasing the STMR or sidetone loss decreases the sidetone level. Thus, when the ambient noise is at or below a predetermined low threshold, e.g., 40 dB SPL, the STMR is set to a constant, e.g., 16 dB. This constant STMR is typically the same as or similar to what the STMR would be set to in a constant sidetone case. As the ambient noise increases from the low threshold (40 dB SPL) to a high threshold (75 dB SPL), the STMR increases. In the example shown in FIG. 5, the increase in the STMR is preferably linear and the STMR increases to 28 dB when the ambient noise increases to the high threshold of 75 dB SPL, thus reducing the sidetone amplitude with increasing noise levels. Above the high threshold of 75 dB SPL, the STMR remains at a maximum constant at 28 dB. As the STMR can be used to control the sidetone level, the STMR transfer function of FIG. 5 may be transformed and described in terms of an adaptive sidetone gain transfer function as shown in FIG. 6.

Figure 6:
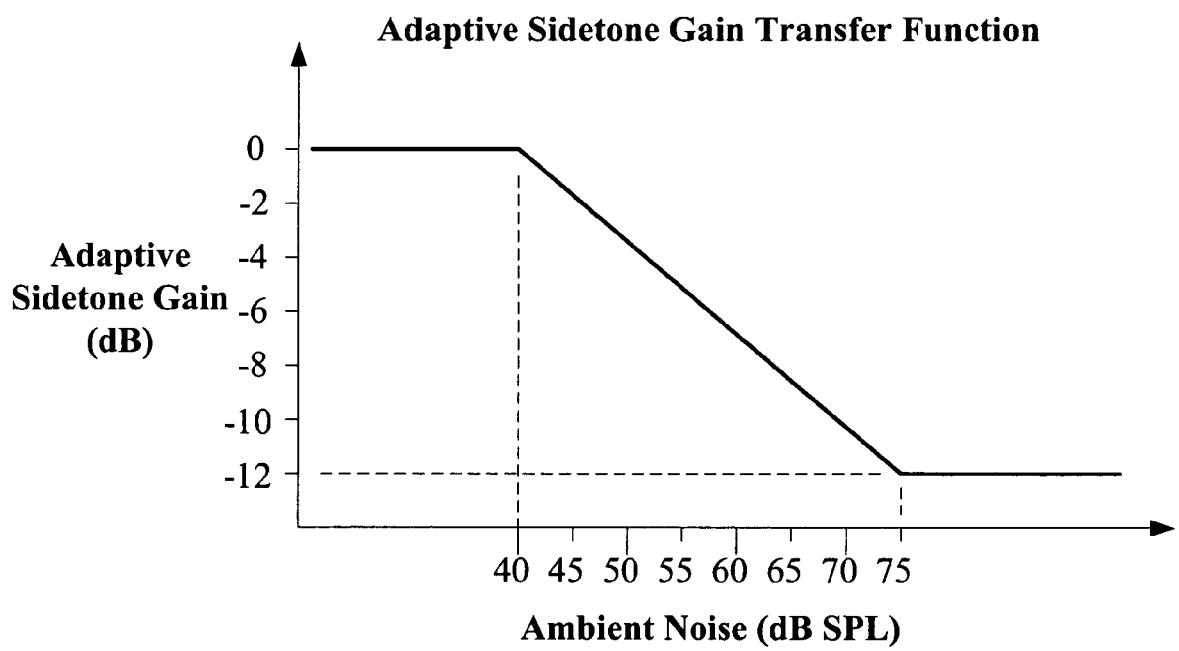
FIG. 6 is an illustrative graph of an ambient noise to adaptive STMR or sidetone gain transfer function corresponding to the ambient noise to sidetone loss or STMR transfer function of FIG. 5.

It is noted that, for telephony applications, reducing the sidetone gain beyond 12 dB as shown in FIG. 6 in the telephony frequency range may not induce the user to speak at a significantly higher level because, at some point, it is too difficult or uncomfortable for the user to speak any louder. The maximum level of sidetone attenuation or the maximum reduction in the sidetone gain is preferably between approximately 10 dB and 12 dB. In addition, at greater than approximately 12 dB of sidetone attenuation, the user may perceive the user's own acoustic free path "sidetone" more than the sidetone from the headset or handset. Thus, further reducing the sidetone gain beyond 12 dB for telephony applications may not achieve any further improvements in the signal to ambient noise ratio (SANR).

As an example, the maximum achievable STMR before the free acoustic path dominates the STMR function may be approximately 28 dB. Thus, the maximum increase in voice level achievable by the adaptive sidetone control using a headset or handset that has an STMR of 16 dB would be at or around a sidetone attenuation of 12 dB.

In addition to implementing the STMR or adaptive sidetone gain transfer function, the adaptive sidetone system preferably also implements attack and release time constants. The attack time constant refers to the rate that the sidetone gain is reduced in response to a sudden increase in background noise and is preferably relatively fast to ensure that the user begins to speak louder as soon as the increase in ambient noise is detected. The release time constant refers to the rate that the sidetone gain recovers after the background noise suddenly diminishes and is preferably longer so as to avoid any gain pumping effect that may be distracting to the user. In general, the attack response may be approximately 1.5 to 2 dB/sec and the release response may be approximately 0.5 to 1 dB/sec. In one example, the attack time constant may be approximately 5 seconds while the release time constant may be approximately 15 seconds. In a digital implementation of the communications system, a hold-off from attack to release on the order of approximately 1 to 5 milliseconds may be implemented.

It is to be noted that FIGS. 4 and 5 merely illustrate one example of an ambient noise to STMR transfer function and a corresponding adaptive sidetone gain transfer function, respectively. Different types of headsets and handsets will generally require different levels of sidetone adaptation, depending on the particular headset/handset design. In addition, various parameters of the adaptive STMR transfer function affect the function and performance of the adaptive sidetone control. For example, the parameters of the adaptive STMR transfer function include minimum and maximum sidetone amplitude attenuation or STMR and the low and high ambient noise level thresholds. Furthermore, the parameters and performance of the ambient noise level detector also affects the function and performance of the adaptive sidetone control. Examples of the parameters for the ambient noise level detector include the attack and release time constants, the noise energy integration period, and the VAD accuracy including VAD false positive and negative rates. The peak to average ambient noise ratio may also affect the performance of the ambient noise level detector and thus the adaptive sidetone control.

Figure 7:
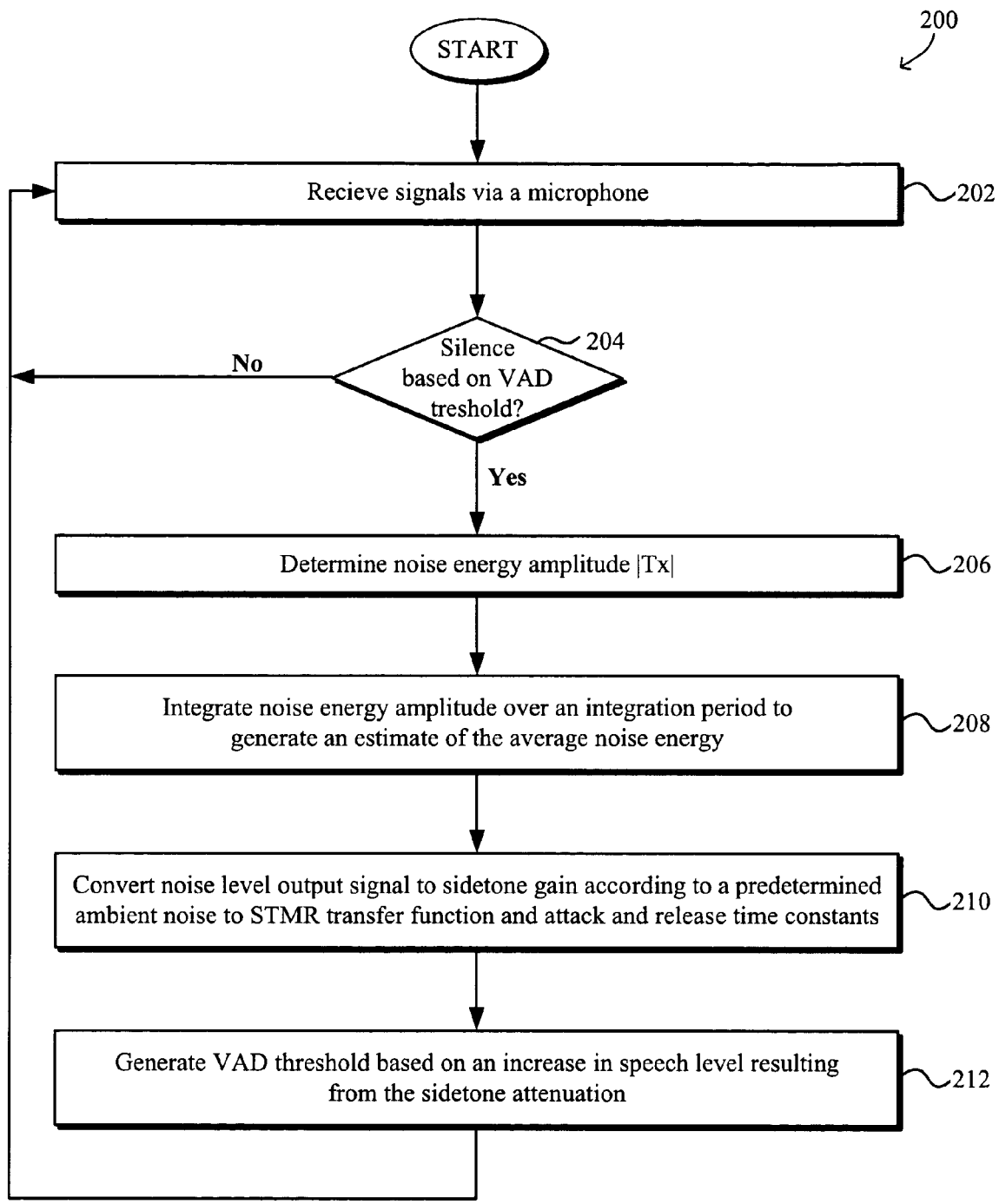
FIG. 7 is a flowchart illustrating a process for adaptive sidetone control.

FIG. 7 is a flowchart illustrating a process 200 for adaptive sidetone control. At step 202, signals are received via the microphone. At step 204, a no voice activity detector detects whether there is silence based on the adaptive VAD threshold. If silence is not detected, the process returns to step 202 for signal processing of the next signals received via the microphone. If silence is detected, the noise energy amplitude |Tx| is determined at step 206 and integrated over an integration period at step 208 to generate an estimate of the average noise energy. At step 210, the noise level output signal is converted to the sidetone gain according to a predetermined ambient noise to STMR transfer function and according to the attack and release time constants. At step 212, the adaptive VAD threshold is generated based on an increase in speech level resulting from the sidetone attenuation. The process then returns to step 202 for signal processing of the next signals received via the microphone.

Because the performance of a speech enhancement algorithm is affected by the accuracy of the VAD, the accuracy of which is in turn affected by the speech to ambient noise ratio (SANR), adaptive sidetone control which improves the SANR can improve the performance of a speech enhancement algorithm, particularly when the headset or handset is used in a high noise environment. For example, any headset or handset that uses DSP to enhance the user's speech and incorporates adaptive sidetone control, should provide more intelligible speech in a high noise environment.

While the preferred embodiments of the present invention are described and illustrated herein, it will be appreciated that they are merely illustrative and that modifications can be made to these embodiments without departing from the spirit and scope of the invention. Thus, the invention is intended to be defined only in terms of the following claims.

What is claimed is:

1. A voice activity detect (VAD) method for detecting voice activity in communications signals, comprising the steps of:
    receiving communications signals at a microphone;
    determining an average noise energy level of the communications signals based on noise energy amplitude during periods of no voice activity;
    converting the average noise energy level to sidetone attenuation, the sidetone attenuation increasing with increased noise energy level;
    generating a VAD threshold based at least in part on the sidetone attenuation; and
    performing VAD based on the generated VAD threshold.

2. The method of claim 1, wherein the step of determining the average noise energy comprises:
    detecting periods of no voice activity;
    determining a noise energy amplitude during the periods of no voice activity; and
    integrating the noise energy amplitude over an integration period to generate the average noise energy.

3. The method of claim 1, wherein the step of converting comprises converting the average noise energy level to sidetone attenuation according to a predetermined ambient noise to sidetone attenuation transfer function and according to attack and release time constants.

4. The method of claim 3, wherein predetermined ambient noise to sidetone attenuation transfer function includes low and high ambient noise thresholds and minimum and maximum sidetone attenuation levels, the sidetone attenuation being set to the minimum sidetone attenuation level when the noise energy level is below the low ambient noise threshold and to the maximum sidetone attenuation level when the noise energy level is above the high ambient noise threshold.

5. The method of claim 4, wherein the sidetone attenuation increases linearly between the minimum and maximum sidetone attenuation levels as the noise level increases from the low to the high ambient noise threshold.

6. The method of claim 1, wherein the step of generating the VAD threshold includes utilizing at least one of an estimated, an actual, or an expected increase in voice level based on the sidetone attenuation.

7. The method of claim 1, wherein the sidetone attenuation is defined in terms of sidetone masking rating (STMR), the STMR ranging between a minimum STMR and a maximum STMR, the STMR being set to the minimum STMR when the noise energy level is below a low ambient noise threshold and the STMR being set to the maximum STMR when the noise energy level is above a high ambient noise threshold.

8. The method of claim 1, wherein the maximum sidetone attention is approximately 12 dB.

9. The method of claim 1, wherein the VAD threshold is increased in proportion to the increase in voice level.

10. The method of claim 1, wherein the VAD threshold is increased based on the sidetone attenuation.

11. The method of claim 1, wherein the VAD threshold includes a VAD vector of thresholds each corresponding to an audio frequency sub-band.

12. The method of claim 1, further comprising the step of reducing a gain on the communications signals in proportion to the increase in voice level.

13. A voice activity detect (VAD) system, comprising:
an adaptive VAD threshold generator configured to generate a VAD threshold based at least in part on a sidetone attenuation, the sidetone attenuation being based on an average ambient noise energy level determined from a noise energy amplitude during periods of no voice activity, the sidetone attenuation increasing with increased noise energy level; and
a comparator configured to compare received signals to the adaptive VAD threshold to determine existence of voice activity.

14. The system of claim 13, wherein the sidetone attenuation is based on the average ambient noise energy level in accordance with a predetermined ambient noise to sidetone attenuation transfer function and in accordance with attack and release time constants.

15. The system of claim 14, wherein predetermined ambient noise to sidetone attenuation transfer function includes low and high ambient noise thresholds and minimum and maximum sidetone attenuation levels, the sidetone attenuation being set to the minimum sidetone attenuation level when the noise energy level is below the low ambient noise threshold and to the maximum sidetone attenuation level when the noise energy level is above the high ambient noise threshold.

16. The system of claim 13, wherein the sidetone attenuation increases linearly between the minimum and maximum sidetone attenuation levels as the noise level increases from the low to the high ambient noise threshold.

17. The system of claim 13, wherein the increase in voice level resulting from sidetone attenuation utilized by the adaptive VAD threshold generator includes at least one of an estimated, an actual, or an expected increase in voice level based on the sidetone attenuation.

18. The system of claim 13, wherein the sidetone attenuation in defined in terms of sidetone masking rating (STMR), the STMR ranging between a minimum STMR and a maximum STMR, the STMR being set to the minimum STMR when the noise energy level is below a low ambient noise threshold and the STMR being set to the maximum STMR when the noise energy level is above a high ambient noise threshold.

19. The system of claim 13, wherein the maximum sidetone attention is approximately 12 dB.

20. The system of claim 13, wherein the VAD threshold is increased in proportion to the increase in voice level.

21. The system of claim 13, wherein the VAD threshold is increased based on the sidetone attenuation.

22. The system of claim 13, wherein the VAD threshold includes a VAD vector of thresholds each corresponding to an audio frequency sub-band.

23. The system of claim 13, further comprising a communications signal gain reducer configured to reduce a gain on the communications signals in proportion to the increase in voice level.

24. A communications system, comprising:
a microphone for receiving communications signals;
a voice activity detector utilizing an adaptive VAD threshold; and
an adaptive sidetone control in communication with the microphone and the voice activity detector, the sidetone control to adaptively control a sidetone level based on an average ambient noise energy level determined from a noise energy amplitude during periods of no voice activity as determined by the voice activity detector, the adaptive sidetone control being configured to adaptively increase attenuation of the sidetone level with increased ambient noise level, wherein the adaptive VAD threshold is generated at least in part on the sidetone level.

25. The system of claim 24, wherein the sidetone attenuation is based on the average ambient noise energy level in accordance with a predetermined ambient noise to sidetone attenuation transfer function and in accordance with attack and release time constants.

26. The system of claim 25, wherein the predetermined ambient noise to sidetone attenuation transfer function includes low and high ambient noise thresholds and minimum and maximum sidetone attenuation levels, the sidetone attenuation being set to the minimum sidetone attenuation level when the noise energy level is below the low ambient noise threshold and to the maximum sidetone attenuation level when the noise energy level is above the high ambient noise threshold.

27. The system of claim 24, wherein the sidetone attenuation increases linearly between the minimum and maximum sidetone attenuation levels as the noise level increases from the low to the high ambient noise threshold.

28. The system of claim 24, wherein the voice activity detector includes:
an adaptive voice activity detect (VAD) threshold generator configured to generate a VAD threshold based at least in part on the attenuation of the sidetone level; and
a comparator configured to compare the VAD threshold with the communications signals to determine existence of voice activity.

29. The system of claim 28, wherein the adaptive VAD threshold generator is configured to generate the VAD threshold based at least in part on an increase in voice level resulting from sidetone attenuation, the increase in voice level utilized by the adaptive VAD threshold generator includes at least one of an estimated, an actual, or an expected increase in voice level based on the sidetone attenuation.

30. The system of claim 28, wherein the VAD threshold is increased in proportion to the increase in voice level.

31. The system of claim 28, wherein the VAD threshold is increased based on the sidetone attenuation.

32. The system of claim 28, wherein the VAD threshold includes a VAD vector of thresholds each corresponding to an audio frequency sub-band.

33. The system of claim 24, wherein the sidetone attenuation in defined in terms of sidetone masking rating (STMR), the STMR ranging between a minimum STMR and a maximum STMR, the STMR being set to the minimum STMR when the noise energy level is below a low ambient noise threshold and the STMR being set to the maximum STMR when the noise energy level is above a high ambient noise threshold.

34. The system of claim 24, wherein the maximum sidetone attention is approximately 12 dB.

35. The system of claim 24, further comprising a communications signal gain reducer configured to reduce a gain on the communications signals in proportion to the increase in voice level.

* * * * *